UNITED STATES PATENT OFFICE.

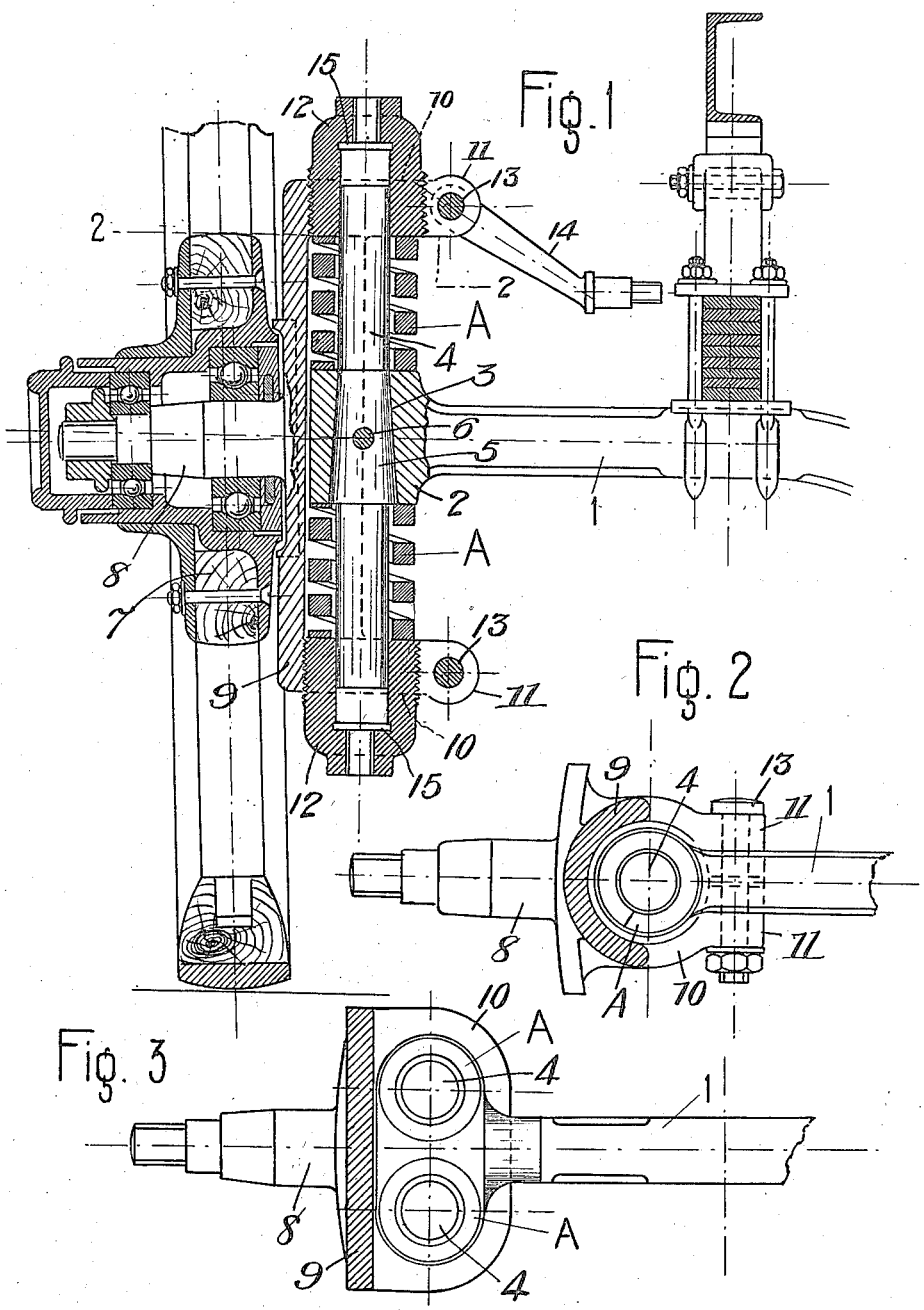

FRANCESCO PAGLIANO, OF TURIN, ITALY.

ELASTIC SUSPENSION DEVICE FOR MOTOR-CARS.

1,034,497.

Specification of Letters Patent. Patented Aug. 6, 1912.

Application filed November 23, 1910. Serial No. 593,833.

*To all whom it may concern:*

Be it known that I, FRANCESCO PAGLIANO, manufacturer, of Corso Vittorio Emanuele No. 37, Turin, Italy, have invented certain new and useful Improvements in Elastic Suspension Devices for Motor-Cars, of which the following is a full, clear, and exact specification.

My invention relates to elastic suspension devices for vehicles constructed to absorb shocks and vibrations, caused by rough road beds or the like, at the juncture of the wheel with the axle of the vehicle.

The objects of my invention are to avoid the rapid change in the molecular structure of the axle, which renders it crystalline and weakens the axle, due to excessive shocks and vibrations, and to provide for the easy riding for the car body.

In the drawings, forming a part of this specification Figure 1, is a vertical central section through a portion of a wheel structure, vehicle axle and related parts embodying my invention. Fig. 2, is a cross sectional view on the line 2—2 of Fig. 1, showing the axle and stud axle in connection with my invention. Fig. 3, is a similar view of Fig. 2, showing the application of my invention to the rear wheels of a vehicle or where there is no necessity for providing steering means at this section of the vehicle.

Similar characters refer to similar parts throughout the views.

In the drawings, 1 designates an axle of the vehicle, carried stationary with the body thereof, having a sleeve portion 2, at its end, which is provided with a vertically disposed conical bore 3. Adapted to be carried by the axle 1 is a guide rod 4, extending above and below the said sleeve portion 2 and having an enlarged portion 5 to fit the said conical bore thereof. The rod 4 is held stationary with the axle 1 by means of a pin 6 passing through the enlarged portions 2 and 5 of the axle 1 and rod 4 respectively.

A wheel structure, indicated at 7 is provided with a stud axle 8 which projects from a yoke 9, the end portions of which yoke are formed as threaded split collars 10 having two clamping ears 11 at the split end portions thereof. Connection between the wheel structure, with its stud axle and yoke, and the axle of the vehicle, through the guide 4, is accomplished by means of threaded caps 12 adapted to be adjustably carried by the threaded collars 10, which form slidable supports for the end portions of the guide rod 4.

Interposed between the sleeve portion 2 of the vehicle axle and each of the threaded caps 12 are compression springs A, compression of which may be adjusted by the turning of the threaded caps, the same being held securely in an adjusted position by tiebolts 13, passing through the clamping ears 11 of the collars 10. One of the bolts 13 may also serve as means for connection of the steering mechanism of the vehicle to the wheel structure, as indicated at 14. If so desired, the threaded caps 12 may be provided with buffers 15 which take up excessive shocks through contact with the ends of the rod 4 should the ability of the springs A be insufficient to do so.

The operation of the device is as follows,— When the vehicle is riding over rough portions of ground, the shocks or vibration is transmitted to the springs A, which reduce the same to a minimum and provide easy riding of the car body. It will be noted that springs are provided above and below the axle by which construction the rise and fall of the car body is controlled and that a rise of the body above the expansibility of the lower springs is controlled by the compression of the upper springs. It will further be seen that the guide rod 4 has sliding bearing at its end portions which construction provides for a firm guiding, in a vertical line, of the movement between the wheel and the vehicle body and that the resistance between the sliding parts, due to the tendency of the vehicle axle to deform the guide laterally, is reduced to a minimum.

In Fig. 3 the invention is shown applied as a connection between the wheel axle and vehicle axle in which two guide rods and sets of compression springs are used, this construction being particularly applicable where it is not desired to steer the vehicle by movement of the wheel with respect to the stationary vehicle axle.

I claim:—

1. In elastic suspension devices for vehicles, the combination of a dead axle provided with a sleeve at its end, a guide rod carried by said sleeve and projecting above and below said axle, a stud axle, a yoke carried by said stud axle and provided with threaded collars having a common axis, bearings adjustably carried by said threaded collars and embracing said rod above and below said dead axle, and springs above and below said sleeve of said dead axle and engaging said bearings, both of said springs being normally under compression and adjustable by said bearings, substantially as and for the purpose set forth.

2. In elastic suspension devices for vehicles, the combination with a dead axle and a wheel axle, of a yoke carried by one of said axles and provided with threaded collars having a common axis, a guide rod carried by the other axle projecting above and below the same, threaded bearings adjustably carried by said threaded collars of said yoke adapted to embrace said rod above and below its axle, and springs interposed between said axle carried by said guide rod, and said bearings, and adapted to be adjusted by the latter, substantially as and for the purpose set forth.

3. In elastic suspension devices for vehicles, the combination with a dead axle and a wheel axle, of a yoke carried by one of said axles and provided with split threaded collars having ears at the split portions thereof, a guide rod carried by the other axle projecting above and below the same, threaded bearings adjustably carried by said threaded collars of said yoke, adapted to embrace said rod above and below its axle, tie bolts for drawing the said ears of said threaded collars together for retaining said bearings in an adjusted position, and springs interposed between said axle carrying said guide rod, and said bearings, and adapted to be adjusted by the latter, substantially as and for the purpose set forth.

In witness whereof, I have hereunto signed my name in the presence of two subscribing witnesses.

FRANCESCO PAGLIANO.

Witnesses:
JOCELYN GOUBEYNAN,
FELICE BAZETTA.